United States Patent [19]
Osborn

[11] Patent Number: 6,107,991
[45] Date of Patent: Aug. 22, 2000

[54] CURSOR CONTROLLER FOR USE WITH A COMPUTER HAVING A GRIPPABLE HANDLE

[76] Inventor: John J. Osborn, 2960 Paradise Dr., Tiburon, Calif. 94920

[21] Appl. No.: 09/111,724

[22] Filed: Jul. 8, 1998

Related U.S. Application Data

[63] Continuation-in-part of application No. 08/694,538, Aug. 9, 1996, Pat. No. 5,821,921.

[51] Int. Cl.$^7$ ........................................... G09G 5/08
[52] U.S. Cl. ........................ 345/157; 345/160; 345/184
[58] Field of Search ...................... 345/157, 160, 345/161, 163, 166, 167, 184, 169; 74/471 XY; 341/27, 2; 200/6 A

[56] References Cited

U.S. PATENT DOCUMENTS

| | | | |
|---|---|---|---|
| 5,004,870 | 4/1991 | Osborn. | |
| 5,086,296 | 2/1992 | Clark | 345/160 |
| 5,327,162 | 7/1994 | Soma | 345/161 |
| 5,704,037 | 12/1997 | Chen | 345/184 |
| 5,790,108 | 8/1998 | Salcudean et al. | 345/184 |
| 5,821,921 | 10/1998 | Osborn et al. | 345/157 |

*Primary Examiner*—Regina Liang
*Attorney, Agent, or Firm*—Jerry G. Wright; Flehr Hohbach Test Albritton & Herbert LLP

[57] ABSTRACT

A cursor controller for use with a computer uses a single moving slider actuated by a handle for indicating X and Y movement by mounting a pair of planar screens each having parallel lines at right angles to each other. Two light sources and associated detectors are respectively arranged on either side of the respective pair of screens so that light pulses resulting from movement of the slider indicate the amount of movement to control the cursor on a computer screen. Each associated detector may be formed by a side-by-side pair of light detectors with intermediate fixed screens having displaced lines to provide a quadrature sine wave output. In effect the pair of screens float between the sources and the detectors to eliminate unnecessary wiring and create a simple robust device. A hand held unit may be constructed by wrapping the screens in a drum shape and placing them in a cylindrical tube where a handle operated by the finger of the user may either axially slide the drum containing the screens for one orthogonal direction or rotate the drum around the axis for the other orthogonal direction.

7 Claims, 4 Drawing Sheets

CURSOR CONTROLLER FOR USE WITH A COMPUTER HAVING A GRIPPABLE HANDLE

This is a continuation-in-part of U.S. patent application Ser. No. 08/694,538, filed Aug. 9, 1996 now U.S. Pat. No. 5,821,921. The present invention is directed to a cursor controller for use with a computer having a grippable handle.

BACKGROUND

Various types of cursor controllers are known such as mouse devices, joy sticks, and controllers having a handle which can be moved in X and Y directions. Ideally a cursor controller with for example a handle movable by one or more fingers should have a feel and action like a pen or a pencil. Such controller should also be inexpensive having a minimal of moving parts (especially moving wires normally required to pick up the motion of the two orthogonal directions of the controller) a very low mass. The pencil-like feel of the handle should be very natural and offer as little resistance as possible.

OBJECT AND SUMMARY OF THE INVENTION

It is the object of the present invention to provide an improved cursor controller with a handle.

In accordance with the above object there is provided a cursor controller, for use with a computer, having a grippable handle movable in two orthogonal directions comprising: a pair of unitarily movable screens each with parallel lines orthogonal to one another. First and second light sources are respectively juxtaposed to the screens on one side of such screens with first and second light detectors on the other side of the screens respectively opposite the first and second light sources. Case means, having an external surface, mount the screens for movement in two orthogonal directions and also fixedly mount the said light sources and detectors; the handle is mounted in proximity to said external surface and connected to the screens to actuate the orthogonal movement of the screens.

The controller as above may be in the form of a rectangular box for use on a desk with a rectangular field over which the handle is moved or for some applications a hand held unit in the shape of a cylindrical tube.

DETAILED DESCRIPTION OF PREFERRED EMBODIMENT

Figure 1:
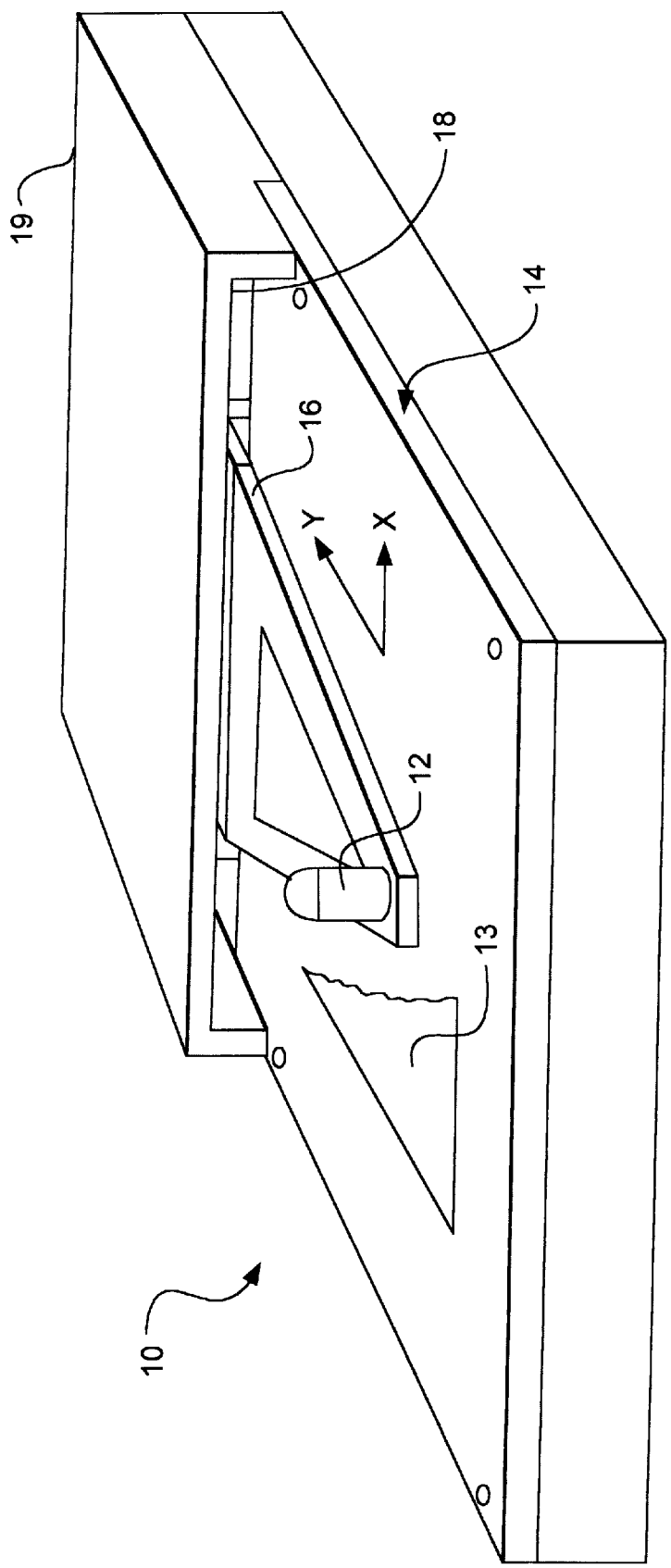
FIG. 1 is a perspective view of a cursor controller of one embodiment of the present invention.

FIG. 1 illustrates a cursor controller 10 which is normally a stand alone unit or may be an integral part of a keyboard. It is more accurately termed a pointing device where the pointing is accomplished by a grippable handle or knob 12 which may be moved over an external working surface 13 of a top cover 14 of the cursor controller 10. Handle 12 is, of course, movable in effective X and Y or directions (that is orthogonal) over a working surface 13. To provide an effective pen down button, the surface is covered with thin metallic foil. When the handle 12 is pushed down a fraction of an inch it touches the foil and closes the circuit which tells the associated computer "pin down." Thus in this respect the handle 12 is an actuator. Alternative techniques would include a switch or any system which closes a circuit when the pen (handle) is pushed down.

Handle 12 is mounted on a bracket 16 which is cantilevered over the working surface 13. The bracket extends through a slot 18 in a rear top cover portion 19. Slot 18 allows the handle 12 and its cantilevered supporting bracket 16 to freely move over the working surface 13. The handle 12 is easily grippable, like a pencil, by the human hand and movable in effective X and Y directions to control the movement of a computer generated cursor.

FIGS. 2A through 2I show a exploded perspective view of FIG. 1 starting with a rectangular base 21 (FIG. 2I) which slidably mounts the lower slider frame 22 (FIG. 2H) for movement in the Y direction. This is accomplished by providing a pair of rails 23a and 23b. Lower slider 22 is a rigid frame which has a pair of apertures 24a and 24b which are respectively opposite the light sources 26a and 26b which are placed in the grooves 27 drilled in the bottom of base 21. Grooves 27 also provide for wiring which exits the base at 28. Lower slider 22 and its apertures 24a and 24b have a range of motion such that the apertures never cover the light sources 26a, 26b.

An upper slider frame 28 (FIG. 2F) is substantially a planar and retains a pair of screens 29a and 29b. The screens in the preferred embodiment are composed of film on which photographic parallel dark lines are placed for example 50 to the inch, each line being 0.01 inch wide. Therefore the space between the lines is equal to the width of the lines. For finer resolutions, lines at least 100 to the inch may be used. The parallel lines of screen 29a are orthogonal to the parallel lines of screen 29b and the two screens have their lines, respectively, parallel to the X and Y directions of motion.

Figure 2:
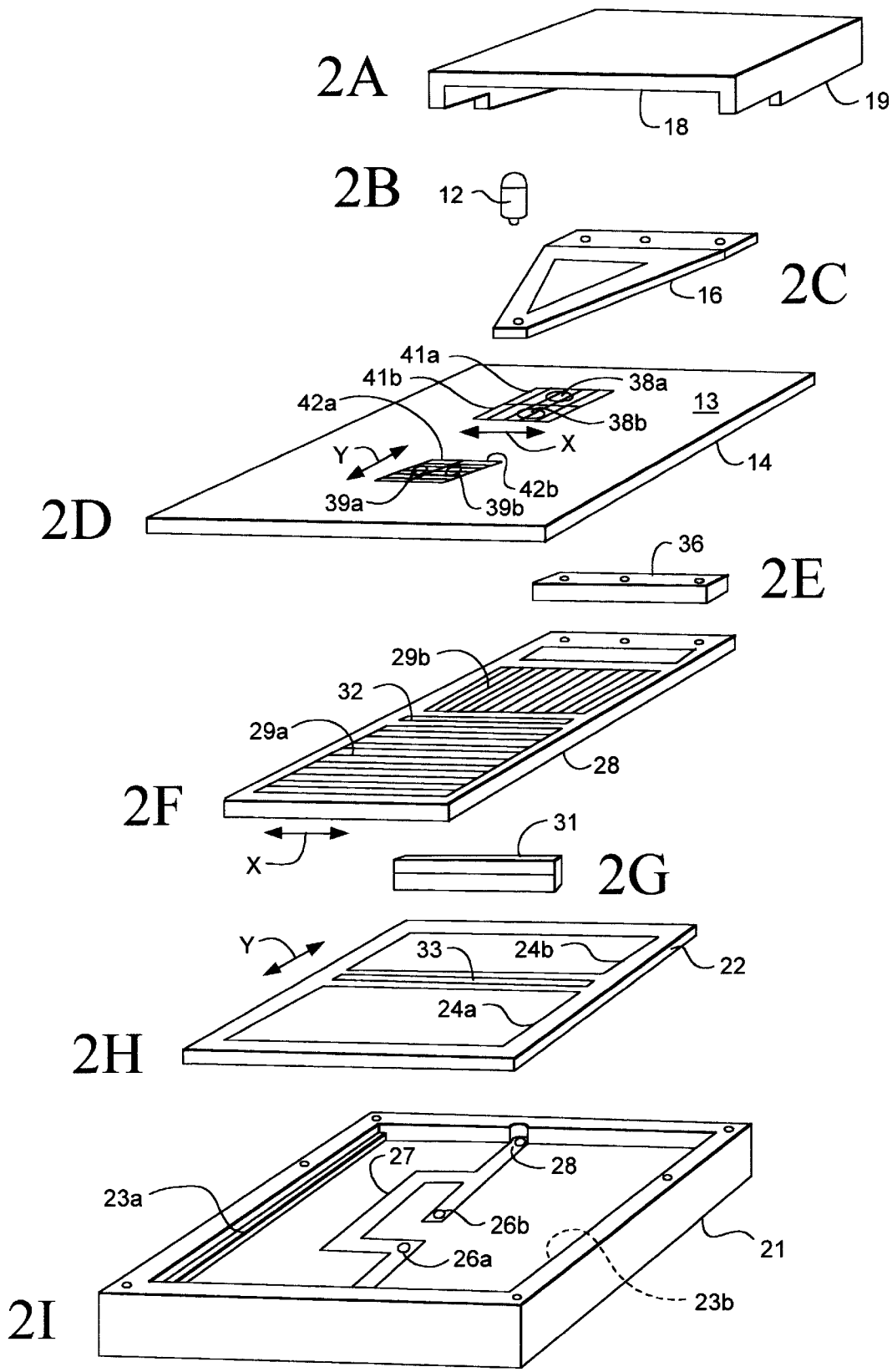
FIGS. 2A through 2I are an exploded view of FIG. 1.

To allow movement of upper slider 28 in the X direction (see the double-ended arrow), as illustrated in FIG. 2G a keel 31 (that is a longitudinal beam) is glued into a X direction slot 32 of upper slider 28. The keel 31 is slidable in the X direction slot 33 of the lower slider 22.

As thus far shown from functional point of view, upper slider 28 may therefore move in the X direction by reason of the keel 31; thus the lines of the screen 29b will cause a pulsing of the light from source 26b. Slider 28 can also move in the Y direction by reason of lower slider 22 being movable on base 21 as described above and this will cause a pulsing of light from light source 26a by the screen 29a. By counting the number of pulses (to be described in detail later) the movement of the slider 28 (and handle 12) can be tracked or sensed.

Figure 3:
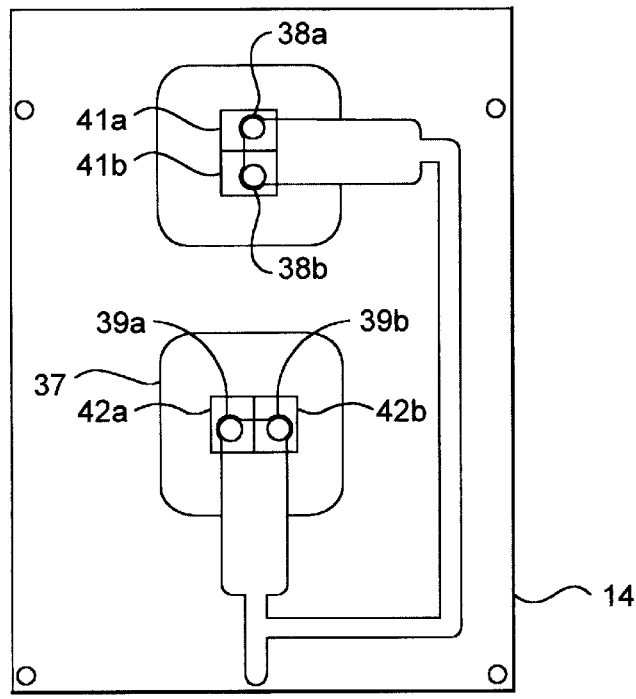
FIG. 3 is a plan view of the underside of a cover of FIG. 1.

Bracket 16 is cantilevered over the external surface 13 of cover 14 by being fastened by a spacer 36 (FIG. 2E) to the upper end of upper slider 28. In order to detect or receive the pulsing light produced by the movement of the screens 29a and 29b the underside of cover 14, illustrated in FIG. 3, that is the side of cover opposite the external surface 13, has milled out grooves 37 for a first pair of light detectors 38a and 38a and second set of light detectors 39a and 39b.

Theoretically only a single light detector is needed to pick up or detect the pulsing light source. But as illustrated in FIG. 2D, detectors 39a and 39b are used for sensing Y direction motion of the upper slider 28 and detectors 38a and 38b sense X direction motion. Covering all of the light detectors as best illustrated in FIG. 2D are small fixed screens which are fixed onto the bottom surface of cover 14; for the X direction light detectors the fixed screens 41a and 41b and the Y direction detectors the fixed screens 42a and 42b. These are also illustrated and outlined in FIG. 3. The orientation of the lines on these fixed screens match the lines on the associated screens 29a and 29b of the upper slider 28 (FIG. 2F).

Figure 4A:
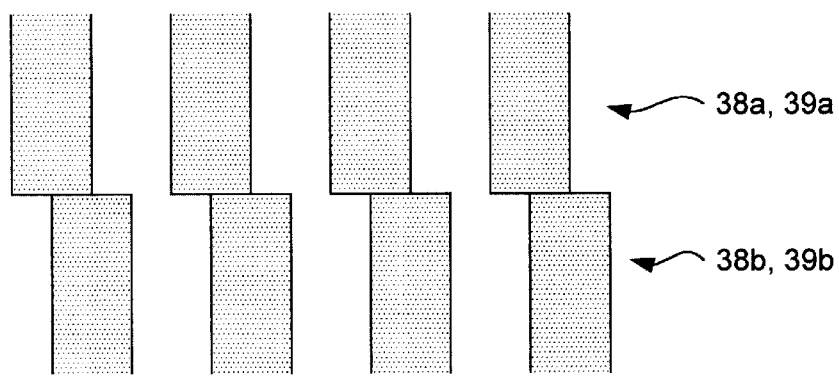
FIG. 4A illustrates a portion of a pair of screens used in FIG. 3.
Figure 4B:
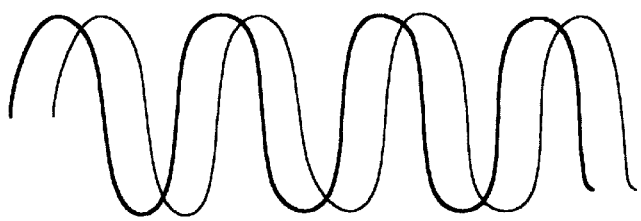
FIG. 4B is a resultant pair of sine waves the screen of FIG. 4A has produced by associated light detectors.

However the lines are drawn as best illustrated in FIG. 4A so that the pair of light detectors receive pulses set apart. Thus the output of each detector of a pair is an effective sine wave as illustrated in FIG. 4B which because of the offset angle (on displacement) of the fixed screens provides a pair of pulses 90° apart. These pulses are the same as a prior art mouse generates so the signal is instantly compatible with existing computers. As an equivalent to the offset shown, one set of lines may merely be slanted.

There are many advantages to the foregoing design. The upper slider 28 which is movable by the pen handle 12 is very light and has very low friction so it is easy to move around like a pen or a pencil. No wires have to be attached to the moving parts (see the milled wire ways in both the base 21 and the cover 14, FIGS. 2I and 3). Only the pen down actuator button 12 requires some type of wiring to indicate its contact with the metal foil on the external surface 13. As compare to a track ball or moving ball mouse no moving wheels are necessary. Only one moving part, the upper slider, "senses" both the vertical and horizontal movement. In comparison a mouse or track ball requires one moving part in each direction. If the handle 12 is released and then returned, the cursor on the screen is always were it has been left. The handle 12 can be moved with the users' "pen" fingers just as in writing which provides for a much better discrimination.

All of the moving parts are made of Delrin plastic or similar low, friction material so that for example the upper slider 28 and its keel 31 as shown in FIGS. 2F and 2G slide easily over the lower slider 22. And also the lower slider 22 slides easily on the rails 23a and 23b of base 21.

From an operational point of view, a single unitary upper slider unit 28 contains all of the motion indicating screens. Thus the two screens are in effect floated between the light detectors and sources and pick up vertical and horizontal (X, Y) movements at the same time by the same moving part. And the pen handle or actuator 12 is directly connected to the single moving part. This has the advantage that dimensional tolerances in the system are not critical. There is essentially no friction from the rails 23a and 23b on which the lower slider 22 moves or the keel 31 of the upper slider. These can be fairly lose fitting. This is because any time the pen handle 12 is moved the upper slider 28 containing the pair of ruled screens is directly connected to the pen handle 12 and even if there is some slight rotation of slider 28 the movement is still directly sensed by the screens.

Figure 5A:
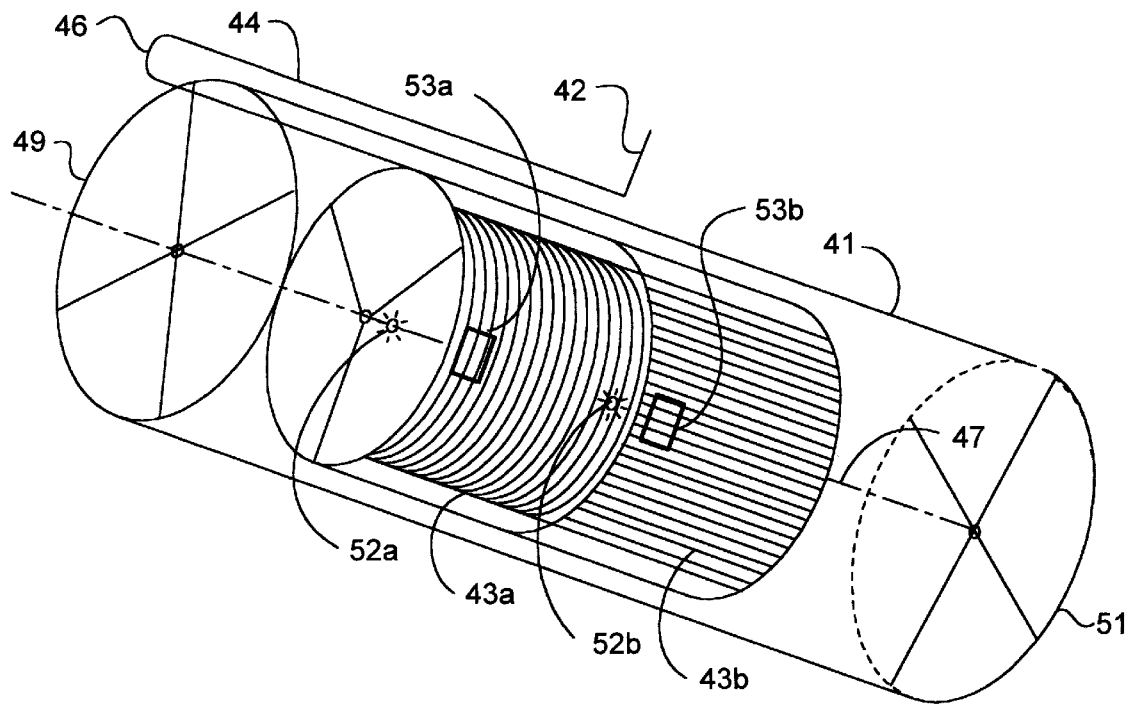
FIG. 5A is a perspective view of an alternative embodiment of the invention.
Figure 5B:
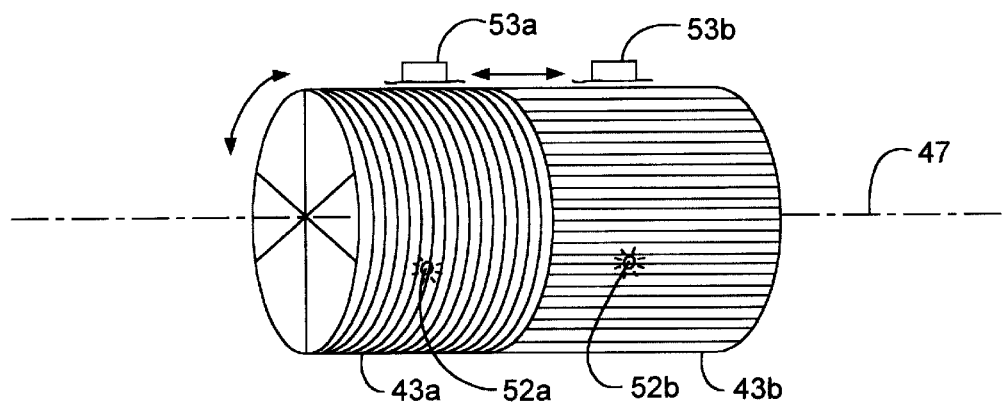
FIG. 5B is a simplified perspective view of an interior part of FIG. 5A.

FIGS. 5A and 5B illustrate an alternative embodiment of the invention where rather than a desktop unit the alternative embodiment is useful as a hand held unit to for example control a tv receiver. Here the casing or enclosure for the unit is in the form of a cylindrical tube 41 (either plastic or metal) which may be easily hand held and which includes a handle 42 grippable by the other hand of the user or even an index finger which is connected to a pair of moving screens 43a, 43b as best shown in FIG. 5B. A U-shaped bracket 44 which is hooked at 46 over the upper end of tube 41 connects the handle 42 to the screens. The screens 43a and 43b form part of a cylindrical drum which is mounted on the central shaft 47 which is fixed to the tube 41 at its ends 49 and 51 by appropriate struts or spokes. Central shaft 47 is of course coincidence with the center line of tube 41. Thus the two screens 43a and 43b are built in a drum of cylindrical shape and as illustrated in FIG. 5A the Y may form a portion of a cylinder. Thus the cylinder could be merely a partial cylinder. With this type of dimensioning the entire hand held unit could be approximately an inch in diameter. Finally, similar to the other embodiment of the invention, fixed on the central shaft 28 are a pair of light emitters 52a and 52b and on the interior surface of tube 41, a pair of double light detectors 53a and 53b which may be constructed similar to that shown in the other embodiment of the invention. Thus the person using this hand held device would slide a thumb button or the handle 42 up and down or around. The simplicity of the unit makes it robust and relatively unbreakable.

Thus an improved cursor controller has been provided.

What is claimed:

1. A cursor controller, for use with a computer, having a grippable handle movable in two orthogonal directions comprising:

a pair of unitarily movable screens each with parallel lines orthogonal to one another;

first and second light sources respectively juxtaposed to said screens on one side of such screens;

first and second light detectors on the other side of said screens respectively opposite said first and second light sources;

case means, having an external surface, for mounting said screens for movement in two orthogonal directions and also for fixedly mounting said light sources and detectors;

and means for mounting said handle in proximity to said external surface and for connecting said handle to said screens to actuate said orthogonal movement of said screens.

2. A cursor controller as in claim 1 where each said light detector includes a fixed screen mounted to said case means between said light source and opposite said light detector for providing a moire effect, said screens having parallel lines, parallel to the lines of the juxtaposed screen.

3. A cursor controller as in claim 2 where each said first and second light detectors includes a pair of light detectors and a pair of said fixed screens with the respective lines of one of such screens displaced from the other of said pair for providing an effective sine wave output from each said detector with the two sine waves offset by a predetermined angle.

4. A cursor controller as in claim 3 where said angle is substantially ninety degrees.

5. A cursor controller as in claim 1 where said case means includes a base for both mounting said first and second light sources and for slidably mounting a lower slider frame for movement in one orthogonal direction, said lower slider frame having a pair of apertures each opposite one of said light sources and also including a slot in a direction orthogonal to its movement, and including upper slider means including a substantially planar type frame for retaining said pair of unitarily movable screens, said upper slider means including guide means for allowing it to be slidable in said slot of said lower slider frame in a direction orthogonal to said lower slider frame movement, said case means including a top cover for fixedly mounting said first and second light detectors opposite said first and second light sources, said other side of said cover having said external surface over which said handle is movable, said means for mounting said handle including bracket means having one end connected to said handle and the other end to said upper slider mean and being cantilevered from the other end of said upper slider means to allow for free actuation of said handle over said external surface.

6. A cursor controller as in claim 1 where said pair of unitarily movable screens is in the form of a rotating drum mounted and slidable on a central shaft with the parallel lines of a screen at one end section of the drum being parallel to said axis and the parallel lines of the other screen at the other end section of the drum being orthogonal to said axis, said casing means including a cylindrical tube where the outer surface of a portion of the tube is said external surface, said tube including means for mounting said central shaft along the centerline of the tube. Said first and second light sources being fixedly mounted on said shaft and said first and second light detectors being mounted on the interior of said cylindrical tube, said means for mounting said handle including a U-shaped bracket having said handle on one end the bracket being hooked over the end of said outer cylindrical tube to said movable drum for actuating axial and rotary movement of said drum.

7. A cursor controller as in claim 5 where said guide means of said upper slider means is a projecting keel slidable in said slot of said lower slider frame.

* * * * *